United States Patent [19]

Müller et al.

[11] 3,978,125

[45] Aug. 31, 1976

[54] CHEMICAL COMPOUNDS AND A PROCESS FOR MAKING POLYURETHANES WITH THE NEW COMPOUNDS AS A CATALYST

[75] Inventors: Erwin Müller; Heinz Thomas, both of Leverkusen, Germany

[73] Assignee: Bayer Aktiengesellschaft, Leverkusen, Germany

[22] Filed: May 3, 1974

[21] Appl. No.: 466,644

[30] Foreign Application Priority Data

May 12, 1973 Germany............................ 2324176

[52] U.S. Cl....................... 260/561 A; 260/2.5 AB; 260/559 A; 260/561 B
[51] Int. Cl.²........................................ C07C 103/38
[58] Field of Search......... 260/561 A, 561 B, 559 A

[56] References Cited

UNITED STATES PATENTS

| | | | |
|---|---|---|---|
| 3,676,493 | 7/1972 | Smith.............................. | 260/559 A |
| 3,697,458 | 10/1972 | Burba et al. .................... | 260/561 A |
| 3,712,926 | 1/1973 | Petersen......................... | 260/561 B |

*Primary Examiner*—C. Davis
*Attorney, Agent, or Firm*—Joseph C. Gil; Gene Harsh

[57] ABSTRACT

New chemical compounds containing at least one aliphatically bound tertiary nitrogen atom and at least one —CO—NH—CH$_2$—OR radical wherein R is an alkyl group of one to six carbon atoms and a process for making polyurethanes with the new compounds as a catalyst are provided.

1 Claim, No Drawings

CHEMICAL COMPOUNDS AND A PROCESS FOR MAKING POLYURETHANES WITH THE NEW COMPOUNDS AS A CATALYST

This invention relates generally to new chemical compounds useful as catalysts for the reaction between an isocyanato group and a reactive hydrogen atom determinable by the Zerewitinoff method and more particularly to new catalysts for use in making polyurethane resins.

Aliphatic compounds which are used as cross-linking agents for the production of semi-rigid polyurethane foams and which are characterized in that in addition to containing at least one hydroxyl group they contain at least one

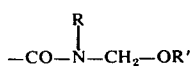

group in which R' represents an alkyl or hydroxyalkyl group containing 1 to 12 carbon atoms and R is preferably hydrogen have been described in German Offenlegungsschrift No. 2,223,484. Groups of this kind are known as carbonamide-N-methylolalkylethers and are described in "Die Makromolekulare Chemie" Vol. 57, 45 (1962). These possible additional reactions are accompanied by cross-linking of the macromolecule. The cross-linking effect of these compounds is attributed to the fact that the hydroxyl groups first react with the NCO groups to incorporate the carbonamide-N-methylolalkylether into the macromolecule. In addition, however, the carbonamide-N-methylolalkylether group may also react as such both with the NCO groups by an insertion reaction:

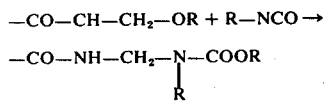

and with the urethane groups which are formed in the foam:

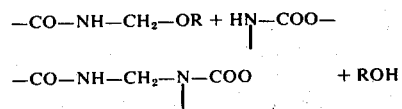

While it is desirable to effect such cross-linking in making semi-rigid polyurethane foams, the cross-linking reactions do not always occur at a desirable reaction rate.

It is therefore an object of this invention to provide a catalyst for the above illustrated chemical reactions. Another object of the invention is to provide novel chemical compounds which can be used to advantage in reactions which produce polyurethanes. Still another object of the invention is to provide an improved process for making semi-rigid polyurethane foams.

The foregoing objects and others are accomplished in accordance with the invention, generally speaking, by providing new chemical compounds which contain at least one aliphatically bound tertiary nitrogen atom and at least one —CO—NH—CH$_2$—OR group in which R is an alkyl group such as methyl, ethyl, propyl, butyl, amyl or hexyl. It has now been found that the reactions indicated above can be substantially accelerated by using the new compounds provided by the invention.

Preferred compounds of the invention are those of the general formula:

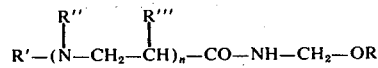

in which $n$ stands for an integer of from 1 to 3,

R is an alkyl radical having 1 to 6 carbon atoms,

R' is an alkyl radical having 1 to 6 carbon atoms, —CH$_2$—CH$_2$OH or RO—CH$_2$—NHCO—CH$_2$—CH$_2$—, R'' is an alkyl radical having 1 to 6 carbon atoms or —CH$_2$—CH$_2$—OH and R''' is H or CH$_3$.

The following are specific examples of compounds of the class provided by the invention:

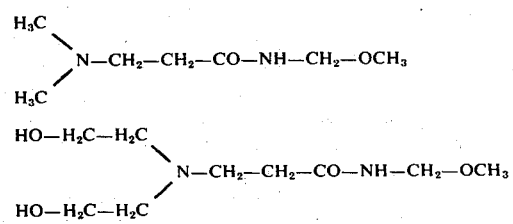

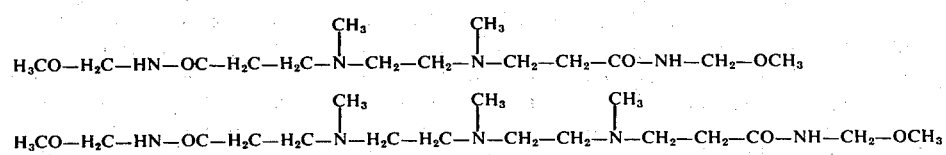

Such compounds can be obtained by known methods, for example by Michael addition of the corresponding secondary amines to acrylamide- or methacrylamide-N-methylolalkylethers such as illustrated in Examples 1 – 5. Their molecular weight is generally below 500.

The compounds which are most preferred for the invention are those represented by the following general formulae:

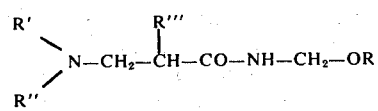

I

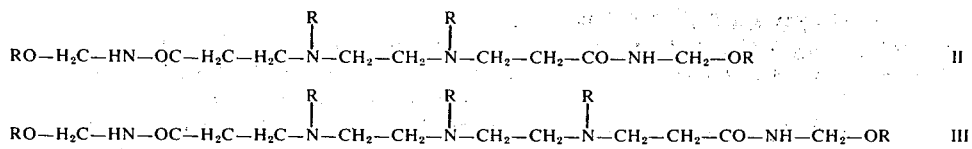

in which
R is an alkyl radical having one to six carbon atoms;
R' and R'' are alkyl radicals having one to six carbon atoms or —CH$_2$—CH$_2$—OH; and
R''' is H or CH$_3$.

This invention also provides a process for the production of polyurethanes, especially polyurethane foams and in particular semirigid foams with the new compounds as catalysts.

The compounds provided by the invention effect a substantial improvement particularly in the physical properties of semi-rigid foams such as their strength and tear resistance as well as their strength of adherence (without the addition of adhesives) to synthetic resins such as polymers of acrylonitrile, butadiene and styrene or polyvinyl chloride polymers.

Any of the known starting components for producing polyurethanes may be used in accordance with the invention including aliphatic, cycloaliphatic, araliphatic, aromatic and heterocyclic polyisocyanates such as those described e.g. by W. Siefken in Justus Liebigs Annalen der Chemie, 562, pages 75 to 136, for example, ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3-diisocaynate, cyclohexane-1,4-diisocyanate and any mixtures of these isomers, 1-isocyanato-3,3,5-trimethyl-5-isocyanato-methyl-cyclohexane (DAS NO. 1,202,785) hexahydrotolylene-2,4-diisocyanate, hexahydrotolylene-2,6-diisocyanate and any mixtures of these isomers, hexahydro-1,3-phenylene diisocyanate, hexahydro-1,4-phenylenediisocyanate, perhydro-2,4'-diphenylmethane diisocyanate, perhydro-4,4'-diphenylmethane diisocyanate, phenylene-1,3-diisocyanate, phenylene-1,4-diisocyanate, tolylene-2,4-diisocyanate, tolylene-2,6-diisocyanate and any mixtures of these isomers, diphenylmethane-2,4'-diisocyanate, diphenylmethane-4,4'-diisocyanate, naphthylene-1,5-diisocyanate, triphenyl-methane-4,4',4''-triisocyanate, polyphenyl-polymethylene polyisocyanates which can be obtained by aniline-formaldehyde condensation followed by phosgenation and which have been described e.g. in British Patent Specification Nos. 874,430 and 848,671, perchlorinated aryl polyisocyanates such as those described e.g. in German Auslegeschrift No. 1,157,601, polyisocyanates which contain carbodiimide groups as described in German Patent Specification No. 1,092,007, the diisocyanate described in U.S. Pat. No. 3,492,330, polyisocyanates which contain allophanate groups as described e.g. in British Patent Specification No. 994,890, Belgian Patent Specification No. 761,626 and published Dutch Patent Application No. 7,102,525, polyisocyanates which contain isocyanurate groups as described e.g. in German Offenlegungsschrift Nos. 1,929,034 and 2,004,048, polyisocyanates which contain urethane groups as described e.g. in Belgian Patent Specification No. 752,261 or in U.S. Pat. No. 3,394,164, polyisocyanates which contain acylated urea groups according to German Patent Specification No. 1,230,778, polyisocyanates which contain biuret groups as described e.g. in German Patent Specification No. 1,101,394, in British Patent Specification No. 889,050 and in French Patent Specification No. 7,017,514, polyisocyanates which are prepared by telomerization reactions as described e.g. in Belgian Patent Specification No. 723,640, polyisocyanates which contain ester groups such as those mentioned e.g. in British Patent Specification Nos. 964,174 and 1,072,956, in U.S. Pat. No. 3,567,763 and in German Patent Specification No. 1,231,688, and reaction products of the above mentioned isocyanates with acetals according to German Patent Specification No. 1,072,385.

The distillation residues which still contain isocyanate groups from the commerical production of isocyanates may also be used, optionally in the form of solutions in one or more of the above mentioned polyisocyanates. Any mixtures of the above mentioned polyisocyanates may also be used.

It is generally preferred to use the commercially readily available polyisocyanates such as tolylene-2,4-diisocyanate and tolylene-2,6-diisocyanate and any mixtures of these isomers ("TDI"), polyphenyl-polymethylene polyisocyanates which can be obtained by aniline-formaldehyde condensation followed by phosgenation ("crude MDI") and polyisocyanates which contain carbodiimide groups, urethane groups or biuret groups ("modified polyisocyanates").

The starting components used according to the invention for producing the polyurethanes also include compounds which contain at least two hydrogen atoms determinable by the Zerewitinoff method and capable of reacting with isocyanates and which generally have a molecular weight of about 400 to about 10,000. These may be compounds which contain amino groups, thiol groups or carboxyl groups but are preferably polyhydroxyl compounds, in particular compounds which contain 2 to 8 hydroxyl groups, especially those with a molecular weight of 800 to 10,000, preferably 1000 to 6000, e.g. polyesters, polyethers, polythioethers, polyacetals, polycarbonates and polyester amides of the kinds which are known in the art for producing both homogeneous and cellular polyurethanes and which contain at least 2, generally 2 to 8 but preferably 2 to 4 hydroxyl groups.

Any suitable polyester with hydroxyl groups may be used, such as e.g. the products obtained by reacting polyvalent alcohols, preferably divalent alcohols with the optional addition of trivalent alcohols, with polyvalent, preferably divalent carboxylic acids. Instead of free polycarboxylic acids, the corresponding polycarboxylic acid anhydrides or polycarboxylic acid esters of lower alcohols or mixtures thereof may be used for producing the polyesters. The polycarboxylic acids may be aliphatic, cycloaliphatic, aromatic and/or heterocyclic and may be substituted, e.g. with halogen atoms, and/or unsaturated. The following are given as examples: Succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally mixed with monomeric fatty acids, dimethylterephthalate, and terephthalic acid-bis-glycol ester. The following are examples of suitable polyvalent alcohols: ethylene glycol, propylene-1,2-and -1,3-glycol, butylene-1,4-and -2,3-glycol, hexane-1,6-diol, octane-1,8-diol, neopentyl glycol, cyclohexane dimethanol (1,4-bis-hydroxymethylcyclohexane), 2-methyl-propane-1,3-diol, glycerol, trimethlolpropane, hexane-1,2,6-triol, butane-1,2,4-triol, trimethylolethane, pentaerythritol, quinitol, mannitol and sorbitol, methyl glycoside, diethylene glycol, triethylene glycol, tetraethylene glycol, polyethylene glycols, dipropylene glycol, poplypropylene glycols, dibutylene glycol and polybutylene glycols. The polyesters may also contain a proportion of terminal carboxyl groups. Polyesters of lactones such as ϵ-caprolactone or hydroxycarboxylic acids such as ω-hydroxy-caproic acid may also be used. The above mentioned low molecular weight polyols which generally have a molecular weight of 62 to 400 may also be included as cross-linking or chain lengthening agents.

Any suitable poly(alkylene ether)polyol which contains at least two and generally 2 to 8, preferably 2 or 3 hydroxyl groups known in the art may be used. Such polyethers can be prepared e.g. by polymerizing epoxides such as ethylene oxide, propylene oxide, butylene oxide, tetrahydrofuran, styrene oxide or epichlorohydrin, each with itself, e.g. in the presence of $BF_3$, or by an addition reaction of these epoxides, optionally as mixtures or successively, with starting components which contain reactive hydrogen atoms such as alcohols or amines, e.g. water, ethylene glycol, propylene-1,3- or -1,2-glycol, trimethylolpropane, 4,4'-dihydroxy-diphenylpropane, aniline, ammonia, ethanolamine or ethylene diamine. Sucrose polyethers of the kind which have been described e.g. in German Auslegeschrift Nos. 1,176,358 and 1,064,938 may also be used according to the invention. It is in many cases preferred to use polyethers which contain predominantly primary OH groups (i.e. up to 90% weight, based on all the OH groups in the polyether). Polyethers which have been modified by vinyl polymers, e.g. those which can be obtained by the polymerization of styrene or acrylnitrile in the presence of polyethers (U.S. Pat. Nos. 3,383,351; 3,304,273; 3,523,093 and 3,110,695 and German Patent Specification No. 1,152,536) and polybutadienes which contain OH groups are also suitable.

Any suitable polythioether may be used such as e.g. the condensation products obtained by condensing thiodiglycol either with itself and/or with other glycols, dicarboxylic acids, formaldehyde, aminocarboxylic acids or amino alcohols. The products obtained are either polythio mixed ethers, polythioether esters or polythioether ester amides, depending on the cocomponent.

Any suitable polyacetal may be used such as e.g. the compounds which can be prepared from glycols such as diethylene glycol, triethylene glycol, 4,4'-dihydroxyethoxy-diphenyldimethyl methane, hexanediol and formaldehyde. Polyacetals which are suitable for the process according to the invention may also be prepared by polymerizing cyclic acetals.

Any of the polycarbonates with hydroxyl groups known to be suitable for polyurethane formation may be used, e.g. those which can be prepared by reacting diols such as propane-1,3-diol, butane-1,4-diol and/or hexane-1,6-diol, diethylene glycol, triethylene glycol or tetraethylene glycol with diarylcarbonates, e.g. diphenyl carbonate or phosgene.

Any suitable polyester amide or polyamide may be used such as e.g. the predominantly linear condensates obtained from polybasic saturated and unsaturated carboxylic acids or their anhydrides and polyvalent saturated and unsaturated amino alcohols, diamines, polyamines and their mixtures.

Polyhydroxyl compounds which already contain urethane or urea groups and modified or unmodified natural polyols such as castor oil, carbohydrates or starch may also be used. Addition products of alkylene oxides with phenol formaldehyde resins and/or urea formaldehyde resins are also suitable for the purpose of the invention.

Representatives of these compounds used according to the invention are described e.g. in High Polymers, Volume XVI, "Polyurethanes, Chemistry and Technology", by Saunders and Frisch, Interscience Publishers, New York, London, Volume I, 1962, pages 32 – 42 and pages 44 – 54 and Volume II, 1964, pages 5 – 6 and 198 – 199, and in Kunststoff-Handbuch, Volume VII, -Vieweg-Hochtlen, Publishers Carl-Hanser-Verlag, Munich, 1966, e.g. on pages 45 to 71, the disclosures of which are incorporated herein by reference.

According to the invention, water and/or readily volatile organic substances are frequently used as blowing agents in the production of polyurethanes. Any suitable organic blowing agents may be used such as, e.g. halogenated alkanes such as methylene chloride, chloroform, ethylidene, chloride, vinylidene chloride, monofluorotrichloromethane, chlorodifluoromethane or dichlorodifluoromethane, or butane, hexane, heptane or diethylether. A blowing action can also be obtained by adding compounds which decompose at temperatures above room temperature to liberate gases, for example nitrogen, e.g. azo compounds such as azoisobutyric acid nitrile. Other examples of blowing agents and details concerning the use of blowing agents may be found in Kunstsoff-Handbuch, Volume VII, published by Vieweg and Hochtlen, Carl-Hanser-Verlag, Munich 1966, e.g. on pages 108 and 109, 453 to 455 and 507 to 510, the disclosure of which is incorporated herein by reference.

Other catalysts may also be used in the process according to the invention in amounts of from 0,001 to 10% by weight based on the quantity of compounds with a molecular weight of about 400 to about 10,000 which contain at least two hydrogen atoms capable of reacting with isocyanates along with the novel catalysts provided herein. For example, known catalysts such as tertiary amines including triethylamine, tributylamine N-methyl-morpholine, N-ethyl-morpholine, N-cocomorpholine, N,N,N',N'-tetramethyl-ethylenediamine, 1,4-diaza-bicyclo-(2,2,2)-octane, N-methyl-N'-dimethylaminoethylpiperazine, N,N-dimethylbenzylamine, bis-(N,N-diethylaminoethyl)-adipate, N,N-diethylbenzylamine, pentamethyl-diethylenetriamine, N,N-dimethylcyclohexylamine, N,N,N',N'-tetramethyl-1,3-butane diamine, N,N-dimethyl-β-phenylethylamine, 1,2-dimethylimidazole, 2-methyl-imidazole and the like may be used in combination with the novel catalysts provided by the invention.

The following are examples of tertiary amines containing hydrogen atoms which are reactive with isocyanate groups which may be used in combination with the novel catalysts of the invention: triethanolamine, triisopropanolamine, N-methyl-diethanolamine, N-ethyl-diethanolamine, N,N-dimethyl-ethanolamine and their reaction products with alkylene oxides such as propylene oxide and/or ethylene oxide.

Silaamines which contain carbon-silicon bonds, e.g. of the kind described in German Patent Specification 1,229,290, may also be used as catalysts, e.g. 2,2,4-trimethyldisiloxane.

Bases which contain nitrogen such as tetraalkylammonium hydroxides, alkali metal hydroxides such as sodium hydroxide, alkali metal phenoxides such as sodium phenoxide or alkali metal alkoxides such as sodium methoxide may also be used as catalysts. Hexahydrotriazines are also suitable.

According to the invention, organic metal compounds may also be included as catalysts, in particular organic tin compounds.

The organic tin compounds used are preferably tin-(II) salts of carboxylic acid (stannous salts) such as tin(II) acetate, tin(II) octoate, tin(II) ethyl hexoate and tin(II) laurate and the dialkyl tin salts of carboxylic acid such as dibutyl tin diacetate, dibutyl tin dilaurate, dibutyl tin maleate or dioctyl tin diacetate.

Other representatives of catalysts which may be used according to the invention and details of the mode of activity of the catalysts have been described in Kunststoff-Handbuch, Volume VII, published by Vieweg and Hochtlen, Carl-Hanser-Verlag, Munich 1966, e.g. on pages 96 to 102, the disclosure of which is incorporated herein by reference.

The novel catalysts are generally used in quantities of about 0.001 to 10% by weight, based on the quantity of compounds with a molecular weight of about 400 to about 10,000 which contain at least two hydrogen atoms capable of reacting with isocyanates.

According to the invention, surface active additives (emulsifiers and foam stabilizers) may also be included. The emulsifiers used may be e.g. sodium salts of ricinoleic sulphonates or of fatty acids or salts of fatty acids with amines such as oleic acid diethylamine or stearic acid diethanolamine. Alkali metal or ammonium salts of sulphonic acids such as dodecylbenzene sulphonic acid or dinaphthyl methane disulphonic acid or of fatty acids such as ricinoleic acid or of polymeric fatty acids may also be included as surface active additives.

Preferred foam stabilizers are the water-soluble polyether siloxanes. These compounds generally have a structure such that a copolymer of ethylene oxide and propylene oxide is linked to a polydimethylsiloxane group. Foam stabilizers of this kind have been described e.g. in U.S. Pat. No. 3,629,308 the disclosure of which is incorporated by reference.

Reaction retarders may also be included according to the invention, e.g. substances which are acid in reaction such as hydrochloric acid or organic acid halides. Cell regulators of the kind known per se such as paraffins or fatty alcohols or dimethylpolysiloxanes, pigments or dyes and flame retarding agents known per se as tris-chloroethylphosphate or ammonium phosphate and polyphosphate, stabilizers which prevent the effects of ageing and weathering plasticizers, fungistatic and bacteriostatic substances and fillers such as barium sulphate, kieselguhr, carbon black or whiting may also be included.

Other examples of surface active additives, foam stabilizers, cell regulators, reaction retarders, stabilizers, flame retarding substances, plasticizers, dyes, fillers and fungistatic and bacteriostatic substances and details of methods of using these additives and their mode of action are described in Kunststoff-Handbuch, Volume VI, published by Vieweg and Hochtlen, Carl-Hanser-Verlag, Munich 1966, e.g. on pages 103 to 113.

According to the invention, the components may be reacted together by the known one-step process, prepolymer process or semi-prepolymer process, in many cases using mechanical devices such as those described in U.S. Pat. Re. No. 24,514. The reactants are preferably adjusted to an H/NCO index of 90 to 130, an index of 100 denoting that the stoichiometric ratio of reactive hydrogen atoms to isocyanate groups is 1:1. Details of apparatus which may also be used for the process according to the invention are described in Kunststoff-Handbuch, Volume VI, published by Vieweg and Hochtlen, Carl-Hanser-Verlag, Munich 1966, e.g. on pages 121 to 205.

To produce semi-rigid foams, which are the prefered products of the invention, the reaction mixture may be introduced into a mold, frequently one which is lined with a plastics foil or film, preferably a vacuum formed foil. The material of which the mold is made may be metal, e.g. aluminum, or a synthetic resin, e.g. epoxy resin. The reaction mixture foams up inside the mold to form the molded product. The process of foaming in the mold may be carried out in such a manner that the product has a cellular structure on its surface or it may be carried out to produce a molded product which has a compact skin and cellular core. According to the invention, the quantity of reaction mixture introduced into the mold may be just sufficient to fill the mold with foam. Alternatively, a larger quantity of reaction mixture than is necessary for filling the mold cavity with foam may be introduced. This is known as overcharging, a method which has already been disclosed, e.g. in U.S. Pat. No. 3,178,490 and in U.S. Pat. No. 3,182,104.

Any suitable waxy mold release agent known in the art may be used in the process of foaming in the mold.

The semi-rigid foams are particularly suitable for technical application in the field of upholstery and cushioning. Both thin-layered and thick-walled foam moldings can be produced. They can generally be removed quite easily from the mold within 10 minutes after the onset of foaming.

The polyurethanes which can be produced according to the invention may, of course, also be used in other fields e.g. as lacquers, coating materials or elastomers or for producing microporous foils or polyurethane dispersions or they may be used for agricultural purposes.

The following Examples serve to explain the invention.

EXAMPLE 1

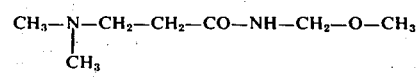

115 g of acrylamide-N-methylol-methyl ether (1 mol) are introduced dropwise into 100 g of dimethylamine solution (45%) (1 mol) at 25° to 60°C with stirring. Stirring is then continued for a further 6 hours at 80°C. The residual water is distilled off at 80°C/12mm and distillation is then continued under vacuum. A water-soluble oil is obtained. Boiling point at 0.05 mm Hg: 97°–100°C. Yield: 158 g of $C_7H_{16}N_2O_2$, molecular weight: 160

Elementary analysis: Calculated: C, 52.5%; H, 10.0%; N, 17.5%; O, 20.0%. Found: C, 52.1%; H, 10.0%; N, 18.1%; O, 19.7%.

EXAMPLE 2

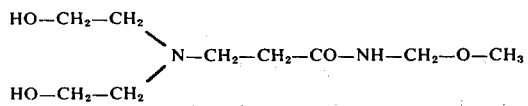

115 g of acrylamide-N-methylolmethylether (1 mol) (for preparation see "Die Makromolekulare Chemie" Volume 57, page 45 (1962) are introduced dropwise into 105 g of bis-(2-hydroxyethyl)-amine (1 mol) at 40° to 70°C with stirring. Stirring is then continued for 6 hours at 80°C and a water-soluble oil which is viscous when cold is obtained. Yield: 220 g, $C_9H_{20}N_2O_4$, molecular weight 220.

Elementary analysis: Calculated: C, 49.1%; H, 9.1%; N, 12.7%; O, 29.1%. Found: C, 48.2%; H, 9.2%; N, 13.0%; O, 29.1%.

EXAMPLE 3

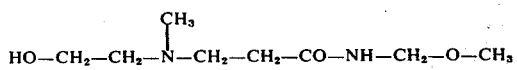

115 g of acrylamide-N-methylol-methylether (1 mol) are introduced dropwise into 75 g of N-methyl-ethanolamine (1 mol) at 40° to 60°C with stirring. Stirring is then continued for 8 hours at 80°C and the reaction mixture is then distilled in a high vacuum. A viscous, water-soluble oil is obtained. Boiling point at 0.02 mm Hg: 118°–120°C, yield: 135 g $C_8H_{18}N_2O_3$, molecular weight: 190

Elementary analysis: Calculated: C, 50.5%; H, 9.4%; N, 14.8%; O, 25.5%. Found: C, 50.4%; H, 9.5%; N, 15.3%; O 25.1%.

EXAMPLE 4

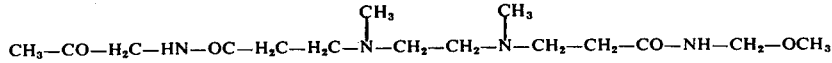

230 g of acrylamide-N-methylol-methylether (2 mol) (for preparation see "Die Makromolekulare Chemie" Volume 57, page 45 (1962) are introduced dropwise into 100 g of N,N'-dimethyl-ethylenediamine (88% aqueous solution (1 mol) at 25° to 60°C with stirring. Stirring is then continued for 8 hours at 80°C and the remaining water is distilled off at 80°C/12 mm Hg. Yield: 315 g $C_{14}H_{30}N_4O_4$, molecular weight: 318.

Elementary analysis: Calculated: C, 52.8%; H, 9.45%; N, 17.6%; O, 20.15%. Found: C, 52.5%; H, 9.1%; N, 18.6%; O, 19.7%.

EXAMPLE 5

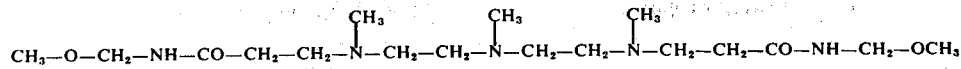

230 g of acrylamide-N-methylol-methylether (2 mols) are introduced dropwise into 150 g of N,N',N''-trimethyl-diethylene triamine (96.7%) (1 mol) at 25 to 60°C with stirring. Stirring is then continued for 8 hours at 80°C, and the remaining traces of water are distilled off at 80°C/12 mm Hg. A reddish brown, water-soluble oil is obtained. Yield: 370 g $C_{17}H_{37}N_5O_4$ molecular weight: 375.

Elementary analysis: Calculated: C, 54.4%; H, 9.8%; N, 18.7%; O, 17.1%. Found: C, 53.8%, H, 9.6%; N, 19.2%; O, 17.1%.

EXAMPLE 6

90 g of a polyether with a molecular weight of 4800 which has been obtained by an addition reaction of propylene oxide (87% by weight) and ethylene oxide (13% by weight) with trimethylolpropane are mixed with 1 g of the compound according to Example 1 having the formula:

5 g of triethanolamine, 2 g of tall oil and 2.5 g of water. This mixture is vigorously mixed with 60 g of a polyphenylpolymethylene polyisocyanate which has an NCO content of 31%, a viscosity of 200 cP/20°C which has been obtained by phosgenating an aniline-formaldehyde condensate and by distilling off dinuclear diisocyanates from the phosgenation product until said viscosity has been reached.

Mixing the components may be carried out with the aid of high pressure or low pressure dosing apparatus. The foamable reaction mixture is introduced into an aluminium mold which has been lined with a vacuum formed ABS/PVC foil (acrylonitrile-butadiene-styrene-copolymer containing polyvinyl chloride and plasticizer). The foaming reaction sets in immediately after introduction of the mixture. The degree of compression is 1:2. The foam removed from the mold has the following properties:

| | | |
|---|---|---|
| Density DIN 53420 | (kg/m³) | 155 |
| Tensile strength DIN 53571 | (kp/cm²) | 4.1 |
| Elongation at break (DIN 53571) | (%) | 50 |
| Compression strength DIN 53577 40% compression | (p/cm²) | 1050 |
| Bond strength between foam and ABS/PVC foil | (p) | 1330 |

EXAMPLE 7

90 g of the polyether of Example 6, 3 g of the compound of Example 2 having the formula

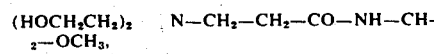
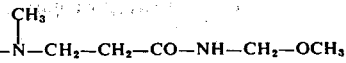

5 g of triethanolamine, 2 g of tall oil, 2.5 g of water and 61 g of the polyisocyanate mentioned in Example 6 are reacted together under the conditions indicated in Example 6. The resulting foam has a degree of compression of about 1:2 and the following properties:

| Density | | |
|---|---|---|
| DIN 53420 | (kg/m³) | 155 |
| Tensile strength | | |
| DIN 53571 | (kp/cm²) | 5.5 |
| Elongation at break | | |
| DIN 53571 | (%) | 55 |
| Compression strength | | |
| DIN 53577 | | |
| 40% compression | (p/cm²) | 1450 |
| Strength of bond between the foam and ABS/PVC foil | (p) | 1290 |

EXAMPLE 8

90 g of the polyether mentioned in Example 6, 3 g of the compound of Example 3 having the formula

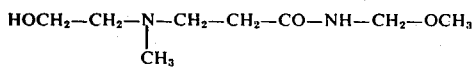

5 g of triethanolamine, 2 g of tall oil 2.5 g of water and 61 g of the polyisocyanate mentioned in Example 6 are reacted together under the conditions indicated in Example 6. The resulting foam has a degree of compression to about 1:2 and the following properties:

| Density | | |
|---|---|---|
| DIN 53420 | (kg/m³) | 160 |
| Tensile strength | | |
| DIN 53571 | (kp/cm²) | 4.3 |
| Elongation at break | | |
| DIN 53571 | (%) | 50 |
| Compression strength | | |
| DIN 53577 | | |
| 40% compression | (p/cm²) | 1170 |
| Strength of bond between foam and ABS/PVC foil | (p) | 1340 |

EXAMPLE 9

90 g of the polyether of Example 6, 3 g of the compound of Example 4 having the formula

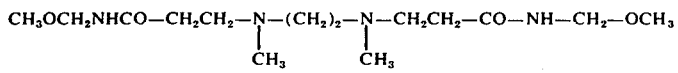

5 g of triethanolamine, 2 g of tall oil, 2.5 g of water and 60 g of the polyisocyanate mentioned in Example 6 are reacted together under the conditions mentioned in Example 6. The resulting foam has a degree of compression of about 1:2 and the following properties:

| Density | | |
|---|---|---|
| DIN 53420 | (kg/m³) | 150 |
| Tensile strength | | |
| DIN 53571 | (kp/cm²) | 3.5 |
| Elongation at break | | |
| DIN 53571 | (%) | 40 |
| Compression strength | | |
| DIN 53577 | | |
| 40% compression | (p/cm²) | 905 |
| Strength of bond between foam and ABS/PVC foil | (p) | 1250 |

EXAMPLE 10

90 g of the polyether of Example 6, 2 g of the compound of Example 5 having the formula

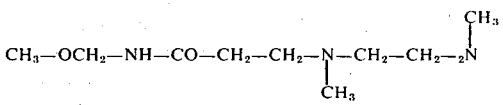

5 g of triethanolamine, 2 g of tall oil, 2.5 g of water and 60 g of the polyisocyanate mentioned in Example 6 are reacted together under the conditions indicated in Example 6. The foam obtained has a degree of compression of about 1:2 and the following properties:

| Density | | |
|---|---|---|
| DIN 53420 | (kg/m³) | 185 |
| Tensile strength | | |
| DIN 53571 | (kp/cm²) | 5.1 |
| Elongation at break | | |
| DIN 53571 | (%) | 40 |
| Compression strength | | |
| DIN 53577 | | |
| 40% compression | (p/cm²) | 1550 |
| Strength of bond between foam and ABS/PVC foil | (p) | 1320 |

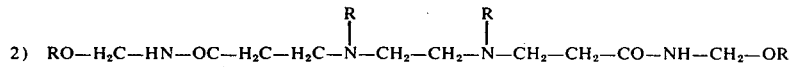

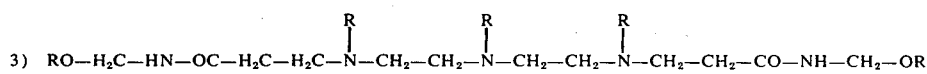

Any of the other catalysts and reactants disclosed as suitable herein can be substituted for those used in the foregoing examples.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A chemical compound having the formula

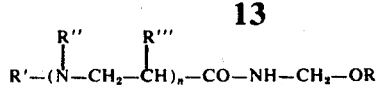
in which
 n stands for an integer of from 1 to 3,
 R is an alkyl radical having 1 to 6 carbon atoms,
 R' is an alkyl radical having 1 to 6 carbon atoms, —CH$_2$—CH$_2$OH or RO—CH$_2$—NHCO—CH$_2$—CH$_2$—, R'' is an alkyl radical having 1 to 6 carbon atoms or —CH$_2$—CH$_2$—OH and R''' is H or CH$_3$.
* * * * *